(12) United States Patent
Newman

(10) Patent No.: US 9,689,617 B2
(45) Date of Patent: Jun. 27, 2017

(54) SYSTEM FOR REDUCING AIR TEMPERATURES ADJACENT AN AIR COOLER

(71) Applicant: Cooling Concepts, Inc., Sandy, UT (US)

(72) Inventor: Larry A. Newman, Sandy, UT (US)

(73) Assignee: Cooling Concepts, Inc., Sandy, UT (US)

( * ) Notice: Subject to any disclaimer, the term of this patent is extended or adjusted under 35 U.S.C. 154(b) by 44 days.

(21) Appl. No.: 14/792,396

(22) Filed: Jul. 6, 2015

(65) Prior Publication Data

US 2016/0187066 A1    Jun. 30, 2016

Related U.S. Application Data

(60) Provisional application No. 62/021,458, filed on Jul. 7, 2014.

(51) Int. Cl.
| | |
|---|---|
| *F28C 3/06* | (2006.01) |
| *F28D 5/00* | (2006.01) |
| *F28C 3/08* | (2006.01) |
| *F28F 27/00* | (2006.01) |
| *F24F 1/00* | (2011.01) |

(52) U.S. Cl.
CPC ............... *F28C 3/08* (2013.01); *F28C 3/06* (2013.01); *F28D 5/00* (2013.01); *F28F 27/00* (2013.01); *F24F 2001/0085* (2013.01); *F28F 2275/22* (2013.01)

(58) Field of Classification Search
CPC ..................................... F28C 3/06; F28D 5/00

USPC ........................................................... 62/314
See application file for complete search history.

(56) References Cited

U.S. PATENT DOCUMENTS

| | | |
|---|---|---|
| 1,933,635 A | 7/1932 | Meyer |
| 2,463,723 A | 3/1949 | Spraragen |
| 3,242,653 A | 3/1966 | Sylvan |
| 3,596,442 A | 8/1971 | Neumann |
| 4,711,649 A | 12/1987 | Berryhill |
| 5,003,789 A * | 4/1991 | Gaona .................. F24F 5/0035 261/25 |
| 5,320,753 A | 6/1994 | Keillor, III et al. |
| 5,529,593 A | 6/1996 | Simmons |
| 5,912,423 A | 6/1999 | Doughty et al. |
| 6,105,376 A | 8/2000 | Stewart et al. |
| 6,221,120 B1 * | 4/2001 | Bennington .......... B01D 46/10 55/385.1 |

(Continued)

*Primary Examiner* — Robert A Hopkins
(74) *Attorney, Agent, or Firm* — Thorpe North & Western, LLP

(57) ABSTRACT

A pre-chill system for reducing the temperature of air entering a cooling system includes a wicking material sheet and a series of frame segments. The frame segments are operable to secure the wicking material sheet to an outer casing of the cooling system in a path along which air enters the cooling system, each of the series of frame segments including one or more magnets magnetically attachable to the cooling system. A misting system is capable of directing moisture adjacent an outer face of the wicking material sheet. The frame segments are magnetically attachable to the outer casing of the cooling system over the wicking material sheet so as to retain the wicking material sheet against the outer casing with the wicking material sheet held between the frame segments and the outer casing.

17 Claims, 2 Drawing Sheets

(56) References Cited

U.S. PATENT DOCUMENTS

| | | |
|---|---|---|
| 6,596,059 B1 | 7/2003 | Greist et al. |
| 6,743,282 B2 | 6/2004 | Najm |
| 6,811,685 B2 | 11/2004 | Wanni et al. |
| 6,843,834 B2 | 1/2005 | Schumacher |
| 7,150,160 B2 | 12/2006 | Herbert |
| 7,322,205 B2 | 1/2008 | Bourne et al. |
| 7,340,912 B1 | 3/2008 | Yoho, Sr. et al. |
| 7,441,412 B2 | 10/2008 | Jensen |
| 7,603,774 B2 | 10/2009 | Facius et al. |
| 7,608,121 B2 | 10/2009 | Boyer et al. |
| 7,757,499 B2 | 7/2010 | Jensen |
| 7,878,012 B1 | 2/2011 | Orten |
| 7,992,406 B1 * | 8/2011 | Reece ................. F28D 5/00 62/259.4 |
| 8,313,567 B2 | 11/2012 | Sullivan |
| 8,404,030 B2 | 3/2013 | Schumacher |
| 2007/0193296 A1 | 8/2007 | McKenna |
| 2010/0095699 A1 | 4/2010 | McKenna |
| 2013/0068099 A1 | 3/2013 | Sullivan |

\* cited by examiner

SYSTEM FOR REDUCING AIR TEMPERATURES ADJACENT AN AIR COOLER

PRIORITY CLAIM

Priority is claimed of and to U.S. Provisional Patent Application Ser. No. 62/021,458, filed Jul. 7, 2014, which is hereby incorporated herein by reference in its entirety.

BACKGROUND

Field of the Invention

The present invention relates generally to systems for use in reducing the air temperature adjacent air coolers such as air conditioning units, refrigeration units, etc.

SUMMARY OF THE INVENTION

In accordance with one aspect of the invention, a pre-chill system for reducing the temperature of air entering a cooling system is provided, including a wicking material sheet and a series of frame segments. The frame segments can be operable to secure the wicking material sheet to an outer casing of the cooling system in a path along which air enters the cooling system, each of the series of frame segments including one or more magnets magnetically attachable to the cooling system. A misting system can be capable of directing moisture adjacent an outer face of the wicking material sheet. The frame segments can be magnetically attachable to the outer casing of the cooling system over the wicking material sheet so as to retain the wicking material sheet against the outer casing with the wicking material sheet held between the frame segments and the outer casing.

In accordance with another aspect of the invention, a pre-chill system for reducing the temperature of air entering a cooling system is provided, including a wicking material sheet and a series of frame segments. The frame segments can be operable to secure the wicking material sheet to an outer casing of the cooling system in a path along which air enters the cooling system. A misting system can be capable of directing moisture to the wicking material. A controller can be coupled to the misting system and can be operable to selectively control when water is supplied to the misting system. An operation sensor can be operably coupled to controller and can be operable to sense movement of the cooling system to active the controller to supply water to the misting system when the cooling system is operating.

In accordance with another aspect of the invention, a method for reducing the temperature of air entering a cooling system is provided, including: positioning a wicking material sheet in a path along which air enters the cooling system; securing the wicking material sheet to an outer casing of the cooling system with at least one frame segment, the at least one frame segment including one or more magnets that magnetically engage the outer casing of the cooling system; and directing a water mist adjacent an outer face of the wicking material sheet to thereby cool air passing through the wicking material sheet prior to entering the cooling system.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
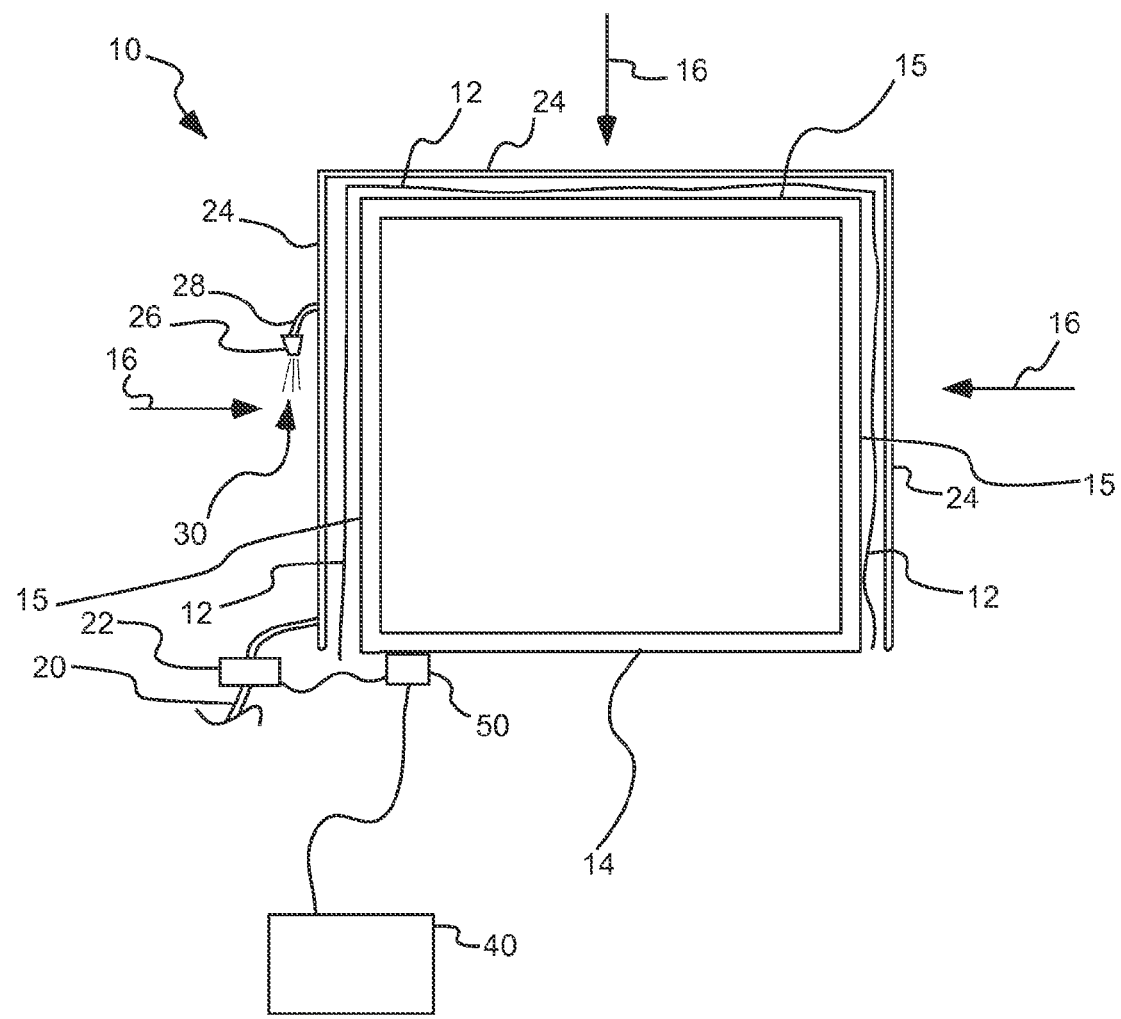
FIG. 1 is a top view of a pre-chill system in accordance with one aspect of the invention, installed on a cooling unit such as a conventional air-conditioning unit.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

The singular forms "a," "an," and "the" include plural referents unless the context clearly dictates otherwise. Thus, for example, reference to "a sheet of wicking material" can include reference to one or more of such sheets.

As used herein, relative terms, such as "upper," "lower," "upwardly," "downwardly," etc., are used to refer to various components of the pre cooling systems discussed herein, and building structures generally, as those terms would be readily understood by one of ordinary skill in the relevant art. It is to be understood that such terms in no way limit the present invention but are used to aid in describing the components of the present systems, and building structures generally, in the most straightforward manner.

As used herein, the term "substantially" refers to the complete or nearly complete extent or degree of an action, characteristic, property, state, structure, item, or result. For example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. For example, an opening that is "substantially free of" material would either completely lack material, or so nearly completely lack material that the effect would be the same as if it completely lacked material. In other words, an opening that is "substantially free of"

material may still actually contain some such material as long as there is no measurable effect as a result thereof.

Invention

The present invention provides apparatuses and methods for reducing the temperature at, or immediately adjacent, fluid intake surfaces of various cooling devices. Cooling devices with which the present technology can be used include air conditioning units, refrigeration units, etc. While the present system can be used with such coolers in a variety of locations, one primary location is rooftop units. Thus, while the following discussion may focus on rooftop units, it is to be understood that the technology is not so limited.

The efficiency of air conditioners using an air-cooled condenser is improved when the intake air temperature is lower. A number of studies indicate an improvement of as much as 1.4% for each degree the air temperature is reduced around the condenser. There are a number of methods that have been used over the years to provide this temperature reduction, but the simplest has been some form of a water misting system, either sprayed directly on the condenser coils, or in the air around the coils. The problem with this method is that dissolved minerals in the water soon build up as deposits on the condenser coils. This mineral scale blocks the air flow and is detrimental to the heat exchange. Most existing misting systems try to combat this problem by either pre-treating the water to remove the dissolved minerals or by coating the condenser coils with chemical scale inhibitors to enable the coils to be more easily cleaned. These methods can be expensive and/or labor intensive.

Another method to prevent mineral deposits on the condenser coils is to use high-pressure pumps to break the water mist droplets into even finer particles to promote a faster evaporation rate. This is only marginally successful, especially in areas of high relative humidity. The high pressure pumps also require additional power.

To address these and other concerns, the present technology provides a pre-chill system that reduces the temperature of air entering a cooling system. An exemplary system is shown at 10 in FIG. 1. The pre-chill system 10 can include a wicking material sheet 12 that, as shown, can be positioned about a cooling system 14 (e.g., a conventional air-conditioning unit) in paths along which air enters the cooling system. These paths are shown by example with directional indicators 16. A misting system can be provided that is capable of directing moisture adjacent an outer face of the wicking material sheet. The wicking system includes a variety of components, including a main water supply 20 that can be attached to a municipal or building water supply external to the system.

The main water supply 20 can include a valve 22 installed in-line therewith to control the flow of water through the main supply. The main water supply can be fluidly coupled to one or more secondary water lines 24 that distribute water around the wicking material sheet 12. A series of spray nozzles 26 can be fluidly coupled to the secondary water lines, through, for example, branch water lines 28. In this manner, if water is allowed to flow through the secondary water lines, it is forced through the spray nozzles and creates a mist (shown by example at 30) adjacent or onto the wicking material sheet. This condition cools the air entering along paths 16, thereby greatly increasing the efficiency with which the cooling system (e.g., A-C unit) operates.

Figure 2:
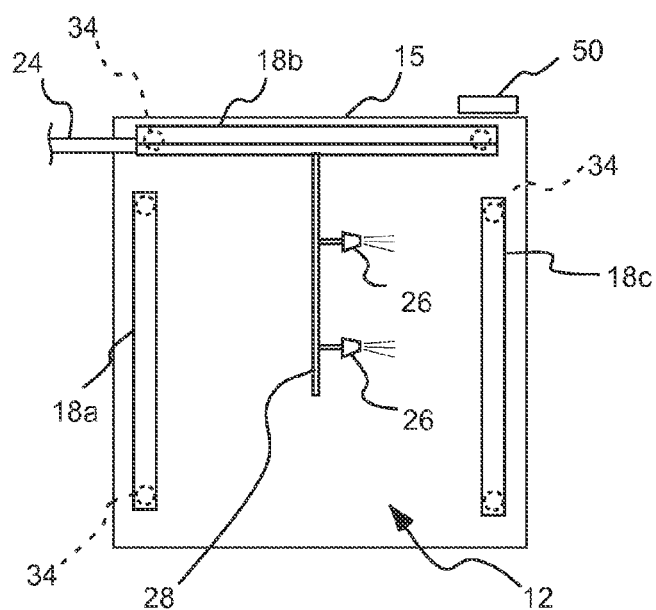
FIG. 2 is a side view of the pre-chill system of FIG. 1.

As best seen in FIG. 2, in one aspect of the invention, a series of frame segments 18a, 18b, 18c, etc. can secure the wicking material sheet to an outer casing 15 of the cooling system. In one aspect of the invention, the frame segments can include one or more magnets 34 coupled thereto. The magnets serve to magnetically attach the frame segments to the cooling system. In one aspect of the invention, the frame segments can be magnetically attachable to the outer casing of the cooling system over the wicking material sheet so as to retain the wicking material sheet against the outer casing with the wicking material sheet held between the frame segments and the outer casing.

The magnetic frame assembly provides a number of advantages. For example, as the wicking material sheet (or sheets) can be sufficiently secured using only the magnetic frame segments, it is not necessary to compromise the frame of the A-C unit with screws, bolts, etc. This can avoid damaging the A-C unit and possibly allowing water to enter the unit through any such ports. In addition, the material wicking sheets can be very quickly and very easily installed in position, and interchanged when desirable (e.g., once a level of deposition of mineral deposits becomes too great). The present inventor has found that the wicking material sheets should be changed with some degree of regularity, depending, among considerations, upon the local environment in which the system is operated. The magnetic frame assembly allows an operator to quickly and easily remove old wicking material sheets and replace them with clean ones.

In addition, the magnetic frame segments 18 need not be particularly well sized for any particular application. Thus, an installer can quickly and easily use one of a number of magnetic frame segments and secure the wicking material sheets in position. It is thus not necessary for a precisely fitted frame to be created for each and every installation. Such frames could otherwise vary in size for every A-C manufacturer, every model, every duty rating, etc. The present technology avoids all such complications while still securely retaining the wicking material against the A-C unit. The present inventor has found that the magnetic frame assembly retains the wicking material in place in wind speeds of up to 90 miles per hour ("mph").

The frame segments can be formed from a variety of materials. In one embodiment, they are formed of a UV-resistant plastic material. Each frame segment can include a number of magnets, either the spot magnets 34 shown, or a strip of magnetic material applied along the frame segments. Each magnet can have a pull of about 50 to 100 lbs.

In one aspect of the invention, a controller 40 is provided that can be operably coupled to the misting system (in the example shown in FIG. 1, the controller is operably coupled to the valve 22). The controller acts to selectively control when water is supplied to the misting system. Thus, the controller can allow water to flow through valve 22, or it can stop the flow of water at valve 22. In general, it is desired to apply water to the misting nozzles 26 only when the A-C unit is in operation (or, as discussed in more detail below, only when certain environmental conditions are met). The controller allows the flow of water to be easily controlled.

Figure 3:
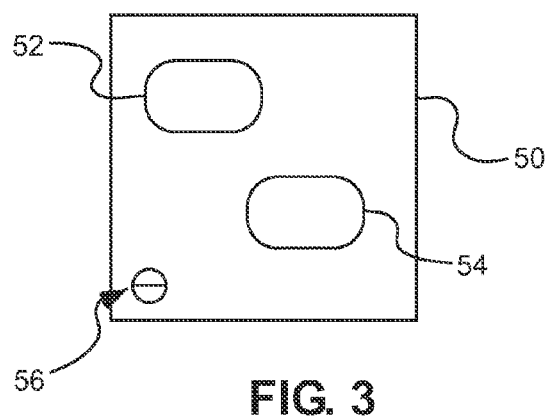
FIG. 3 is a schematic view of an exemplary operation sensor in accordance with an embodiment of the invention.

One manner in which the flow of water can be easily controlled is through the use of operational sensor 50. This sensor can be operably coupled to the controller (and the valve 22) to only allow water to flow through the secondary water lines 24 when certain conditions are met. In one aspect of the invention, the operational sensor 50 can include a directional sensor 52 (FIG. 3) that is sensitive to both static and dynamic acceleration. Thus, if no movement is sensed from the A-C unit, the sensor 52 serves to command the operational sensor to indicate to the controller 40 that the valve 22 should be closed. In this case, flow of water to the nozzles is stopped. Once the A-C is activated, through normal means unrelated to the pre-chill system, the movement sensor 52 will detect this movement, and command the valve to open, allowing the flow of water. In this manner, water is not allowed to flow through the misting nozzles unless the A-C unit is operating.

This feature provides a number of advantages. For example, as water is not flowing unless the pre-chill effect is desired, the wicking material remains clean much longer. Also, the risk of water damage is lessened, as is the wasted use of water. In addition, the operational sensor can be easily mounted to an external surface of the cooling system's casing 15. In the example shown in FIG. 2, the operational sensor 50 is simply and easily magnetically attached to the top of the A-C unit. It is thus not necessary for an installer to open the A-C unit (at all) to, for example, tap into a control circuit in the A-C unit to get a signal indicating when the A-C is activated. As conventional A-C units have very complex circuitry, with many varying voltages for many systems, this feature of the invention provides an enormous improvement over conventional systems that have had to sense, electronically, when the A-C unit was activated.

In addition to sensing movement, the operational sensor 50 can include a temperature/humidity sensor 54 that senses localized temperature and humidity. In this manner, the pre-chill system can remain inactive in environments where, even when the A-C unit is operating, the pre-chill system is not desired. This can be the case, for example, when outside temperatures are relatively low already, where the ambient humidity is already too high, etc.

The operational sensor 50 can also include one or more inputs, to allow a user to modify desired set points, temperature and humidity ranges, sensitivity of the motion sensor 52, etc. This input is illustrated generically at 56, but can take a number of forms. One of ordinary skill in the art, having possession of this disclosure, will readily appreciate the operation of such components.

Power to each of the controller 50 (and its onboard sensors), the valve 22, etc., can all be provided with a simple 9V battery that can be, for example, carried by the controller 50. This power level is sufficient to operate the entire system. The battery can be replaced at regular intervals such as, for example, when the wicking material sheets are replaced.

It will thus be appreciated that the present system can be entirely installed and operated without causing any damage to the casing of the A-C unit, and without ever opening the A-C unit. It is completely isolated, electronically and mechanically, from the normal functions of the cooling system.

Figure 2A:
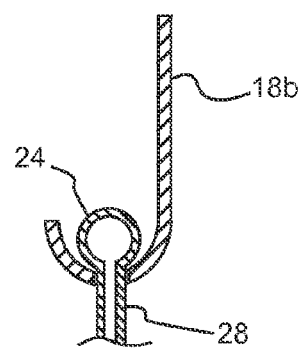
FIG. 2A is a sectional view of a portion of a frame segment and a water tube carried therein.

FIG. 2A illustrates one manner in which the secondary 24 and branch 28 water lines can be distributed around the wicking material 12. The upper magnetic frame segment 18b can include a "J" shape in which the secondary water line can be retained. One or more notches can be formed in the frame segment 18b to allow the branch water lines 28 to extend downwardly from the secondary water lines to allow the misting nozzles 26 to be distributed across the face of the wicking material. In this manner, nearly all, if not all, tubing associated with the misting system can be easily installed into position along with the magnetic frame segments.

The following specifications illustrate various other features and advantages of the invention:

In one (not necessarily all) embodiment(s), when the temperature is above a set point, which varies between 75 and 80 degrees F., and the relative humidity is below 90%, and the vibration sensor detects the condenser fan is on, the controller circuit board sends a signal to the solenoid valve 22 to open water to the misting nozzles. If the ambient temperature drops below the set point, the water is shut off by a signal from the circuit board. If the condenser fan stops, the water is shut off by a signal from the circuit board. If the relative humidity goes above 90%, the water is shut off by a signal from the circuit board. For misting to be activated, all three of these conditions need to be in the optimum zone.

The controller 50 can consist of a programmable logic board, powered by a 9-volt battery. It can read and interpret digital signals sent from the onboard sensors to open and close a latching solenoid valve (22) which turns on/off the water to the misting nozzles (26). The use of a latch solenoid can greatly reduce the power consumption of the overall system.

In one aspect, the motion sensor 52 can be an omni-directional sensor sensitive to both static and dynamic acceleration. Its power draw can be less than about 80 nA. It can operate at temperatures between −20° F. to 185° F.

In one aspect, the temperature-humidity sensor (54) can have 2.5 mA max current use during conversion (while requesting data). It can provide 20%-90% humidity readings, and can provide 32° F.-122° F. temperature readings. It can sample at 1 Hz (once every second).

Generally speaking, many modern air conditioning systems incorporate an Economizer, which can utilize outside air which may be cooler than the desired indoor temperature to mix with the air conditioned air to provide more efficient overall cooling. However, in conditions of high humidity, the outside air may contain more heat in the form of latent heat and can actually increase cooling costs. To avoid this problem, sometimes sensors to determine total latent and sensible heat content, or enthalpy, are installed. Sensible heat can be determined by the temperature of the air, but to determine the latent heat, the humidity of the air must be known. Once the enthalpy is determined, a controller can shut off the ducts bringing in the outside air that contain too much total heat.

However, since the present system only cools the AC condenser and doesn't affect any air entering the building, its enthalpy controls have a different function. The present system's enthalpy control serves to protect the condenser and compressor from damage. The compressors are designed to operate at ambient temperatures above 60° to 65° F. Operating at temperatures below this range can cause compressor failure and excess wear. To optimize air conditioner efficiency while ensuring the present system doesn't allow operation below 65° F., the present system includes a total heat, or enthalpy control system. In order to ascertain the entropy of the system, the relative humidity is standardized to address any latent heat. Once that is done, a temperature reading can determine the sensible heat and total heat content.

With conventional systems that utilize an Economizer, too much enthalpy can be a problem. But, with the present system, too little enthalpy could potentially be a problem. The efficiency of the condenser coil's heat exchange is determined by the mass of the cooling air and the sensible temperature differential between the air and the condenser coils. Therefore the sensible temperature should be kept as low as possible while eliminating any danger of going below 65° F. The present system makes sure this never happens, by raising and standardizing the humidity, thus eliminating the humidity variable.

Various factors can be considered when designing the proper misting coverage for the present system. This can include, without limitation, air conditioner tonnage, CFM airflow from the condenser fan, area of the condenser coils, nozzle placement and spray angle, and water pressure (minus line friction loss).

In addition, the wicking material sheets (12) can act as a final moisture barrier from which any remaining water droplets evaporate. After extensive testing, 87% of the wet bulb temperature is achieved through nozzle design, then, the 3-dimensional, multi-filament, hydrophilic treated wicking material sheets increase the wet bulb temperature to well over 90%. Once maximum humidity is established, the enthalpy of the system can be determined by a temperature reading. The present system incorporates a built-in thermostat to ensure that the water does not come on until all the conditions for safety and optimum efficiency have been met.

In one embodiment, a 200 mesh water pre-filter can be connected to the water source with a normal hose pressure of 35 to 65 p.s.i. The water supply line can be a ¼" UV resistant, reinforced rubber hose with a working pressure of 200 p.s.i. For larger AC units, ⅜" copper tubing can be used to provide additional water volume.

The misting nozzles can be a polycarbonate composite and can include a built in filter screen. The composition of the nozzles resists clogging or scale deposition and the built in 200 mesh filter prevents particulates from interfering with low pressure misting.

The material wicking sheets can be formed from a three-dimensional fiberglass filter screen designed to prevent water droplets, dirt and debris from passing through, while not restricting the air flow to the condenser coils. The wicking material provides a pressure drop of less than 0.05 inches of water at a face velocity of 500 cu. ft./min. The fiberglass micro-fibers also provide a surface for microscopic water droplets to accumulate long enough to more completely evaporate. The arrangement and number of misting nozzles combined with the unique properties of the wicking material sheet provide a system cooling efficiency of more than 85%.

While the figures illustrate the use of a single sheet of wicking material 12, it is to be understood that a series of individual sheets could also be used. For example, each side of the A-C unit could be receive a single sheet, if desired or practicable for any particular A-C layout.

In addition to the structural features discussed above, the present invention also provides a method for reducing the temperature of air entering a cooling system. The method can include positioning a wicking material sheet in a path along which air enters the cooling system. The wicking material sheet can be secured to an outer casing of the cooling system with at least one frame segment, the at least one frame segment including one or more magnets that magnetically engage the outer casing of the cooling system. Water mist can be directed adjacent an outer face of the wicking material sheet to thereby cool air passing through the wicking material sheet prior to entering the cooling system.

The method can include selectively directing the water mist adjacent the outer face of the wicking material sheet when the cooling system is in operation, and selectively ceasing application of the water mist when the cooling system is not in operation. Selectively directing the water mist can include sensing motion of the cooling system when the cooling system is in operation. Sensing motion of the cooling system can be accomplished using a motion sensor magnetically coupled to an outer casing of the cooling system.

These methods can be accomplished without accessing any internal components of the cooling system.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

I claim:

1. A pre-chill system for reducing the temperature of air entering a cooling system, comprising:
    a wicking material sheet;
    a series of frame segments, operable to secure the wicking material sheet to an outer casing of the cooling system in a path along which air enters the cooling system, each of the series of frame segments including one or more magnets magnetically attachable to the cooling system; and
    a misting system capable of directing moisture adjacent an outer face of the wicking material sheet;
    the frame segments being magnetically attachable to the outer casing of the cooling system over the wicking material sheet so as to retain the wicking material sheet against the outer casing with the wicking material sheet held between the frame segments and the outer casing;
    wherein at least one of the frame segments includes retaining notches for retaining tubes of the misting system.

2. The pre-chill system of claim 1, further comprising a controller operably coupled to the misting system, the controller operable to selectively control when water is supplied to the misting system.

3. The pre-chill system of claim 2, further comprising an operation sensor, operably coupled to the controller, the operation sensor operable to sense movement of the cooling system to enable the controller to control supply of water to the misting system when the cooling system is in operation and to stop the flow of water to the misting system when the cooling system is not in operation.

4. The pre-chill system of claim 3, wherein the operation sensor is operable to sense relative humidity and temperature.

5. The pre-chill system of claim 3, wherein the operation sensor is magnetically attached to the outer casing of the cooling system.

6. The pre-chill system of claim 3, wherein the misting sensor is electronically isolated from the cooling system.

7. The pre-chill system of claim 1, wherein the system can be installed and operated without access to any internal components of the cooling system.

8. A pre-chill system for reducing the temperature of air entering a cooling system, comprising:
    a wicking material sheet;
    a series of frame segments, operable to secure the wicking material sheet to an outer casing of the cooling system in a path along which air enters the cooling system; and
    a misting system capable of directing moisture to the wicking material;
    a controller, coupled to the misting system and being operable to selectively control when water is supplied to the misting system; and
    an operation sensor, operably coupled to controller, the operation sensor operable to sense movement of the cooling system to active the controller to supply water to the misting system when the cooling system is operating.

9. The pre-chill system of claim 8, wherein the frame segments include one or more magnets attached thereto, the frame segments being attachable to the outer casing of the cooling system over the wicking material sheet so as to retain the wicking material sheet against the outer casing with the wicking material sheet held between the frame segments and the outer casing.

10. The pre-chill system of claim 8, wherein the operation sensor is operable to sense relative humidity and temperature.

11. The pre-chill system of claim 8, wherein the operation sensor is electronically isolated from an electrical system of the cooling system.

12. The pre-chill system of claim 8, wherein at least some of the frame segments include retaining notches for retaining tubes of the misting system.

13. A method for reducing the temperature of air entering a cooling system, comprising:
   positioning a wicking material sheet in a path along which air enters the cooling system;
   securing the wicking material sheet to an outer casing of the cooling system with at least one frame segment, the at least one frame segment including one or more magnets that magnetically engage the outer casing of the cooling system;
   sensing motion of the cooling system when the cooling system is in operation;
   selectively directing a water mist adjacent an outer face of the wicking material sheet when the cooling system is in operation to thereby cool air passing through the wicking material sheet prior to entering the cooling system, and selectively ceasing application of the water mist when the cooling system is not in operation to.

14. The method of claim 13, wherein sensing motion of the cooling system is accomplished using a motion sensor magnetically coupled to an outer casing of the cooling system.

15. The method of claim 14, wherein the motion sensor is electronically isolated from an electrical system of the cooling system.

16. The method of claim 13, wherein at least one of the frame segments includes retaining notches for retaining tubes of the misting system.

17. The method of claim 13, wherein the method is accomplished without accessing any internal components of the cooling system.

* * * * *